W. I. RANDLE.
ANTISKID MEANS FOR AUTOMOBILE WHEELS.
APPLICATION FILED FEB. 26, 1921.
1,420,667.
Patented June 27, 1922.
2 SHEETS—SHEET 1.
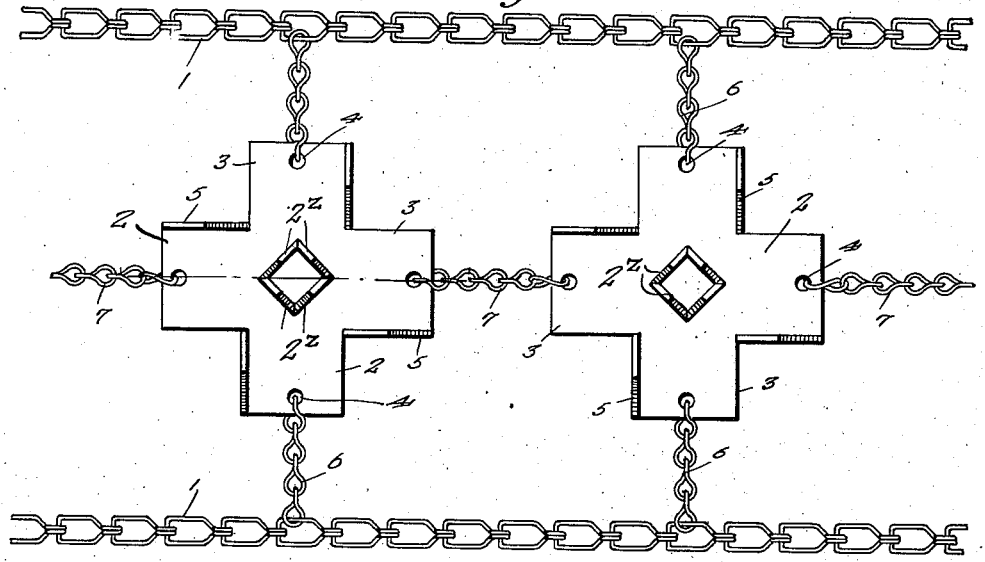
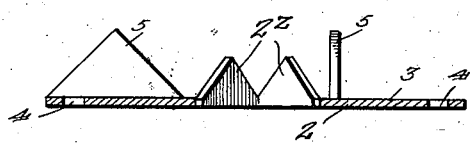
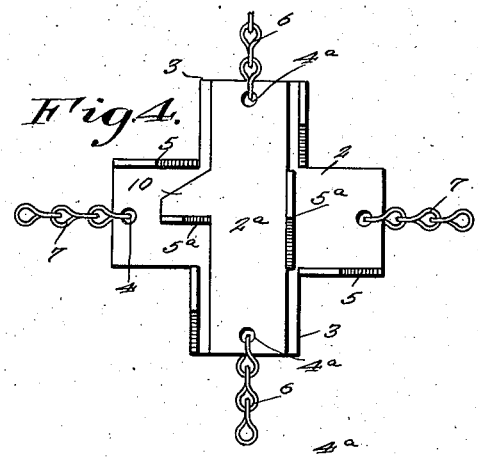
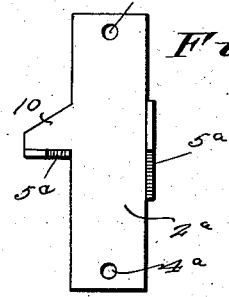
W. I. Randle
INVENTOR
BY Victor J. Evans
ATTORNEY
WITNESSES W. I. RANDLE.
ANTISKID MEANS FOR AUTOMOBILE WHEELS.
APPLICATION FILED FEB. 26, 1921.
1,420,667.
Patented June 27, 1922.
2 SHEETS—SHEET 2.
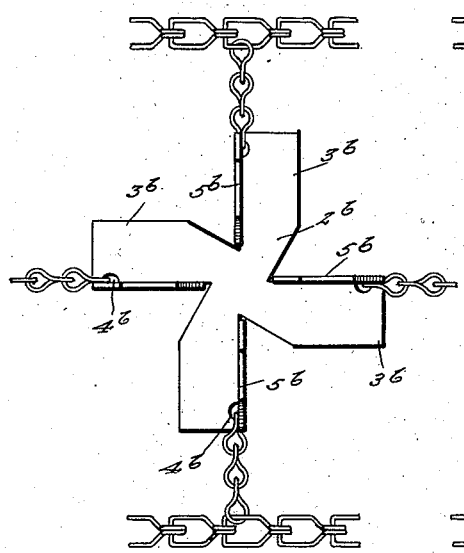
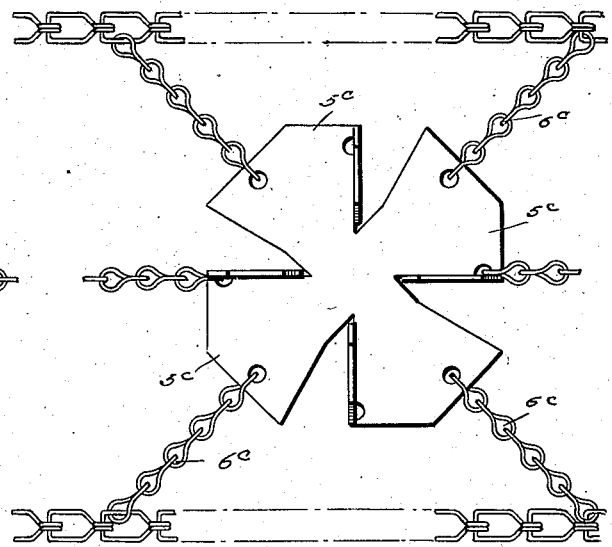
W. I. Randle  INVENTOR

UNITED STATES PATENT OFFICE.

WILBERT I. RANDLE, OF FLINT STONE, MARYLAND.

ANTISKID MEANS FOR AUTOMOBILE WHEELS.

1,420,667. Specification of Letters Patent. Patented June 27, 1922.

Application filed February 26, 1921. Serial No. 448,134.

*To all whom it may concern:*

Be it known that I, WILBERT I. RANDLE, a citizen of the United States, residing at Flint Stone, in the county of Allegany and State of Maryland, have invented new and useful Improvements in Antiskid Means for Automobile Wheels, of which the following is a specification.

The object of my present invention is the provision of simple and highly efficient anti-skid means in the nature of attachments adapted to be associated with mud chains and connected in working position with a wheel through the medium of the mud chain.

To the attainment of the foregoing, the invention consists in the improvement as hereinafter described and definitely claimed.

In the accompanying drawings, forming part hereof:—

Figure 1 is a view illustrating the connection of two of my novel attachments together and with mud chains; the attachments being shown in plan.

Figure 2 is a detail transverse section taken in the plane indicated by the line 2—2 of Figure 1.

Figure 3 is a plan view of an auxiliary attachment designed to be employed in conjunction with the attachment shown in Figure 1.

Figure 4 is a view illustrating the auxiliary attachment as properly arranged relatively to an attachment of the kind shown in Figure 1.

Figures 5 and 6 are plan views illustrative of modified attachments constructed in accordance with my invention.

Similar numerals of reference designate corresponding parts in Figures 1 and 2 to which reference will first be made.

In Figure 1, 1 are chains that are designed to extend entirely around a wheel at opposite sides of the tire and felly thereof with a view to holding my novel attachments in working position on the tread of the tire, and 2, 2 are the attachments of which any desired number and size may be employed at intervals around the tread of the tire. The said attachments are each formed of a single piece of appropriate sheet metal, and each is of cruci-form configuration. Each is provided adjacent to the outer ends of its arms 3 with apertures 4, and each is provided at one side of each arm with a barb flange 5; the said barb flanges being disposed at right angles to the body of the attachment and being of general obtuse angle form so as to sink into and take secure hold of the ground. For convenience of manufacture and in order to prolong the usefulness of the attachments I prefer to harden the barb flanges after the same are bent into position at right angles to the bodies of the attachments.

My novel attachments are connected with the chains 1 through the medium of transverse sub-chains 6, and the attachments are connected together in a series extending entirely around the tread of a wheel through the medium of longitudinal central chains 7, interposed between and connected to the attachments as illustrated.

It will be apparent from the foregoing that anti-skid means constructed in the manner shown in Figures 1 and 2 and hereinbefore described in detail is light in weight and well adapted to withstand ordinary usage and at the same time is possessed of the capacity of preventing skidding of a wheel, this latter being due in large measure to the flat bearing of the bodies of the attachments against the tread of a tire, and to the disposition of the flanges 5 at right angles to the bodies, and the obtuse angle formation of the flanges 5 whereby the same are adapted to sink into mud or snow as well as to take secure hold of hard pavements and icy surfaces.

Preferably, though not necessarily, employed about the centers of the attachments 2 and $2^x$ of Figures 1 and 2 are barbs $2^z$ preferably struck from the attachments as shown. These barbs $2^z$ manifestly add to the gripping capacity of the attachments.

In Figure 3 I show an auxiliary attachment $2^a$. This attachment $2^a$ is apertured adjacent to its ends as indicated by $4^a$ for the connection of chains 6 and is provided on one of its long sides with a barb flange $5^a$, and is also provided on its opposite long side with a lateral arm 10 on one edge of which is a barb flange $5^a$ disposed at right angles to the first-named barb flange $5^a$. As clearly shown in Figure 4 the auxiliary attachment is designed to be superimposed upon and employed in conjunction with the attachment 2 of Figure 1; the apertures $4^a$ serving for the connection of the chains 6. When the auxiliary attachment is combined with an attachment 2, it will be apparent that the auxiliary attachment will increase the efficiency of the attachment 2 in preventing skidding; also, that the auxiliary attachment bears on the barbs 2ᶻ of the attachment 2.

In the modification shown in Figure 5, the attachment 2ᵇ is provided with arms 3ᵇ, apertured at 4ᵇ for the connection of chains, and each arm 3ᵇ is provided on one of its edges with a right angle barb flange 5ᵇ. The barb flanges 5ᵇ are preferably of truncated-cone shape in outline as illustrated and are adapted to take secure hold of the surface of a road with a view to precluding skidding.

The construction of attachment shown in Figure 6 differs from that shown in Figure 5 only in the shape of the arms 5ᶜ and the oblique arrangement of the sub-chains 6ᶜ.

It will be appreciated from the foregoing that each and all of the disclosed embodiments of my invention are light in weight, inexpensive and durable, and at the same time are adapted to efficiently prevent skidding of an automobile wheel by which they are carried irrespective of the character of the road traversed by the wheel.

The embodiments herein illustrated and described constitute the best practical embodiments of my invention of which I am cognizant. I would have it understood, however, that in the future practice of the invention various modifications may be made without involving departure from the scope of my appended claims.

Having described my invention, what I claim and desire to secure by Letters-Patent, is:—

1. A non-skid attachment for wheels, comprising a cruciform plate of metal having at corresponding sides of its arms barb-flanges, one to each arm, and also having apertures for the connection of means to hold the attachment on a tire.

2. A non-skid attachment for wheels, comprising a cruciform plate of metal having at corresponding sides of its arms barb-flanges, one to each arm, and also having apertures for the connection of means to hold the attachment on a tire; the said barb-flanges on the plate being disposed at angles to the major portion of the plate, and being blunt and hardened.

In testimony whereof I affix my signature.

WILBERT I. RANDLE.